United States Patent
Narvaez et al.

(10) Patent No.: US 6,549,312 B2
(45) Date of Patent: Apr. 15, 2003

(54) METHOD FOR DESIGNING OPTICAL FILTER CARDS

(75) Inventors: Paolo Narvaez, Mountain View, CA (US); Naimish Patel, North Andover, MA (US); Farzana I. Khatri, Andover, MA (US); Murat Azizoglu, Concord, MA (US); Kayi Lee, Cambridge, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 39 days.

(21) Appl. No.: 09/852,428

(22) Filed: May 9, 2001

(65) Prior Publication Data

US 2002/0167742 A1 Nov. 14, 2002

(51) Int. Cl.$^7$ .......................... H04J 14/02; G02B 6/293
(52) U.S. Cl. .......................................... 359/124; 385/24
(58) Field of Search ................................. 359/618, 583, 359/885, 589, 124, 119, 127, 111, 130, 237, 125; 385/24, 16, 18, 37

(56) References Cited

U.S. PATENT DOCUMENTS

| | | | | |
|---|---|---|---|---|
| 5,760,934 A | * | 6/1998 | Sutter et al. ................ | 359/119 |
| 5,812,291 A | * | 9/1998 | Bendelli et al. ............. | 359/127 |
| 6,002,503 A | * | 12/1999 | Mizrahi ...................... | 359/119 |
| 6,198,864 B1 | * | 3/2001 | Lemoff et al. .............. | 359/124 |
| 2001/0050790 A1 | * | 12/2001 | Graves et al. .............. | 359/110 |

* cited by examiner

*Primary Examiner*—Georgia Epps
*Assistant Examiner*—Omar Hindi
(74) *Attorney, Agent, or Firm*—Lahive & Cockfield, LLP

(57) ABSTRACT

A method is provided for optical filter card design that facilitates a relatively efficient filter assignment algorithm solution resulting in a filter design that reduces a probability of unnecessary wavelength regenerations.

23 Claims, 5 Drawing Sheets

METHOD FOR DESIGNING OPTICAL FILTER CARDS

FIELD OF THE INVENTION

The invention relates to optical add/drop nodes, and more particularly to a method for designing optical add/drop nodes to maximize a result of known optical filter assignment algorithms in selecting optical filter cards for dropping predetermined wavelengths from an optical signal.

BACKGROUND OF THE INVENTION

Optical add/drop nodes add and drop wavelengths in an optical network. An optical filter card acts as the vehicle for dropping the wavelengths. The optical filter card contains filters that drop selective wavelengths or groups of wavelengths. Regenerators are used at the add/drop nodes to add wavelengths. The regenerators contain laser light sources that can provide the desired light source for adding a wavelength. These components are typically found on a wavelength interface card ("WIC").

There are conventional types of optical filter cards that are customarily used in optical add/drop nodes. The first type drops four wavelengths at a time, while the second type drops six wavelengths at a time. Wavelengths that are not dropped optically bypass the add/drop node and continue toward their destinations over the optical network.

If a wavelength needs to be dropped at a given optical add/drop node, there must be an optical filter card that contains a filter for that wavelength. However, the optical filter card will likely also contain filters that drop other wavelengths. If the optical network design requires that the other additional wavelengths not terminate at the optical add/drop node, then the one or more of the other additional wavelengths require regeneration. Regeneration of the wavelengths is relatively costly since a new pair of WICs is required for every wavelength that is regenerated and such devices add to the cost of an optical network system.

Known filter assignment algorithms determine and assign the correct optical filter cards to utilize at each optical add/drop node in a manner such that the number of wavelength interface cards is minimized. A goal of the filter assignment algorithms is to choose optical fiber cards that drop as few non-terminating wavelengths as possible. As a result, such filter assignment algorithms maximize the number of wavelength bypasses at an optical add/drop node and minimize the number of wavelength regenerations; thus reducing the relative cost of the optical network.

The known filter assignment algorithms require the stipulation of a number of available optical filters. Each of the optical filters must filter different combinations of optical wavelengths so that the filter assignment algorithms have a variety of combinations to choose from in attempting to minimize the number of wavelength regenerations required.

Sets of optical filter cards must be designed that facilitate the filter assignment algorithm. Each optical filter card must contain a predetermined selection of wavelengths for the optical filter card to drop so that the filter assignment algorithm can find as efficient a solution as possible.

SUMMARY OF THE INVENTION

There is a need for a method of optical filter card design that facilitates a relatively efficient filter assignment algorithm solution resulting in a filter design that reduces a probability of unnecessary wavelength regenerations. The present invention is directed toward further solutions to address this existing need.

According to one example embodiment, a method for designing optical filter cards begins with providing a plurality of optical wavelength filters for filtering predetermined optical wavelengths disposed on a plurality of filter cards. The method continues with determining which of the optical wavelengths are filtered by each of the optical wavelength filters. A correlation is designated between optical wavelengths filtered by each of the optical wavelength filters. Additional optical filter correlations are then assigned to arrive at the designed optical filter card arrangement.

The step of providing can include determining a set of optical wavelengths requiring filtering in accordance with one embodiment of the present invention.

The determining step can be carried out by identifying specific wavelength filters to correspondingly filter said optical, according to a further aspect of the present invention.

The step of designating can include indicating a correlation between any wavelengths located on a same filter grouping.

The assigning step can include indicating a correlation between wavelengths of different filter groupings, such that distal wavelengths are grouped to form the correlation.

In accordance with a further embodiment of the present invention, the method can further include the step of manufacturing the optical filter cards having an arrangement of filters designed to minimize a need for regeneration of wavelengths unnecessarily dropped by the filter cards.

Still further aspects of the present invention include an optical filter node. The optical fiber node includes a plurality of optical filters arranged into a plurality of filter cards, wherein each of the plurality of optical filter cards is optimized to contain predetermined groupings of optical filters.

The optical filter node, according to one embodiment of the present invention, includes the predetermined groupings of optical filters such that each of the predetermined groupings of optical filters correlates distal optical wavelengths with each other.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
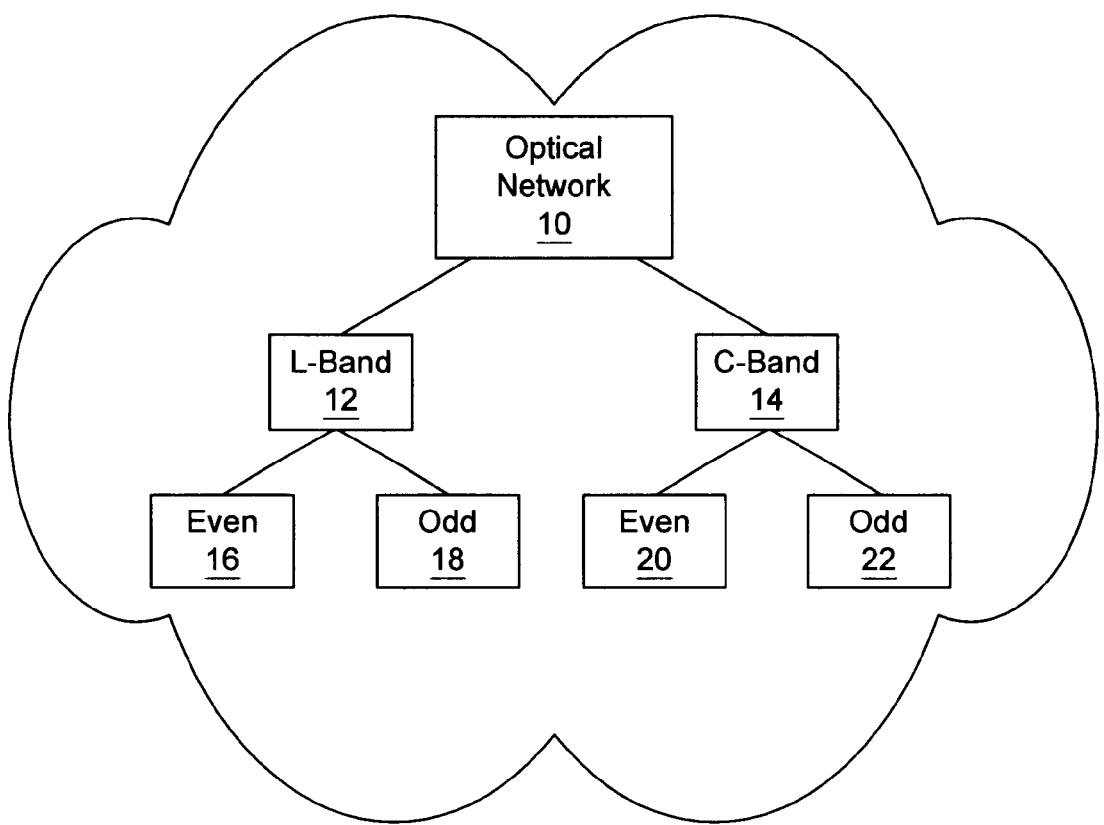
FIG. 1 is a diagrammatic illustration of a an optical network according to one aspect of the present invention.

The present invention generally relates to a method for designing optical filter cards within an optical add/drop node of an optical network. The method includes laying out potential wavelength combinations for optical filter cards and generating correlations between different wavelength combinations so that the resulting filter card design maximizes the probability that unnecessary regeneration optical signals will not occur.

FIGS. 1 through 5, wherein like parts are designated by like reference numerals throughout, illustrate an example embodiment of a method for designing optical filter cards according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments and structures disclosed, such as the size, shape, or type of elements or materials, in a manner still in keeping with the spirit and scope of the present invention.

FIG. 1 illustrates an example of a hierarchy found in an optical network 10. The optical network 10 uses up to one hundred sixty wavelengths to transmit data. These wavelengths are divided into two bands, a C-band 12 and an L-band 14, with eighty wavelengths in each band. Each band 12 and 14 is further divided into an even group 16 and 20, and an odd group 18 and 22, with forty wavelengths in each group. Those skilled in the art will appreciate that the present invention is not limited to an optical network with such a hierarchy. This hierarchy is shown purely for illustrative purposes.

An optical add/drop node 24 for such an optical network 10 may drop up to one half of the available wavelengths. Some of the wavelengths on the even groups need to be used for optical monitoring and cannot be dropped. Therefore, eighteen wavelengths from each of the even groups are droppable, whereas twenty-two wavelengths from each of the odd groups are droppable in the illustrated optical network. Any of these eighty wavelengths can be dropped at an optical add/drop node 24 if the corresponding filter is present. The rest of the wavelengths are not dropped by an optical add/drop node 24.

Figure 2:
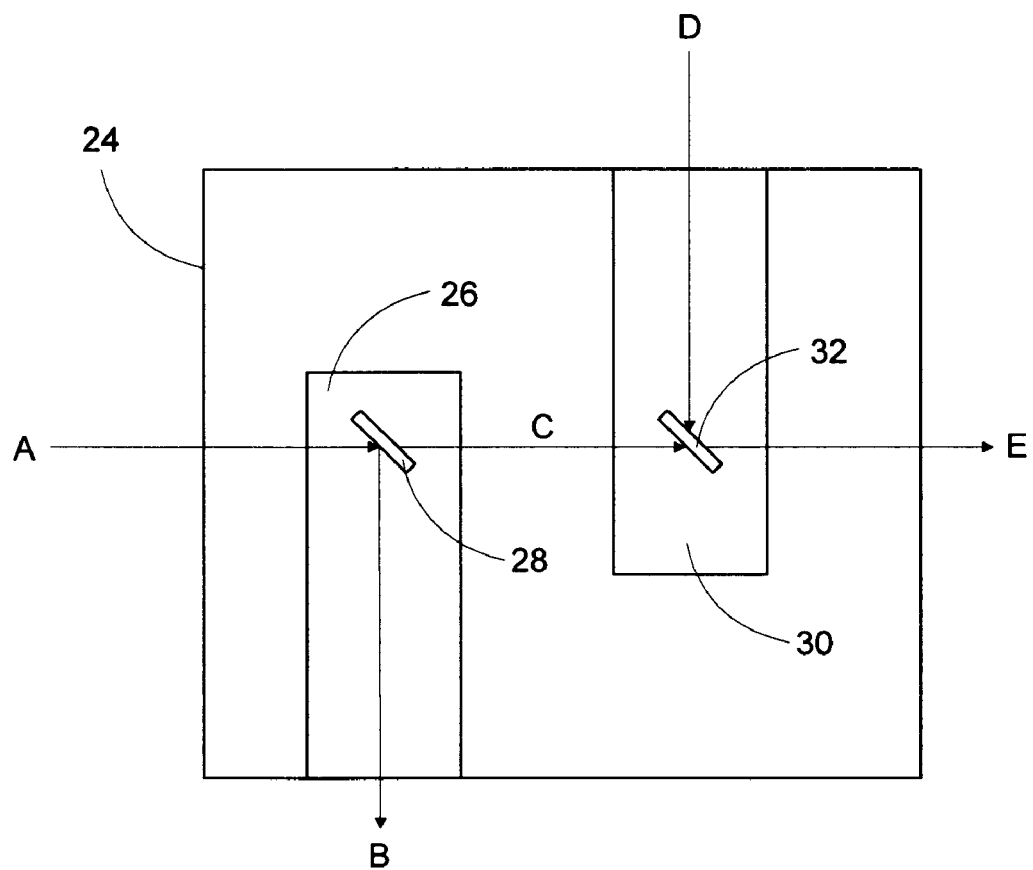
FIG. 2 is a diagrammatic illustration of an optical add/drop node according to one aspect of the present invention.

FIG. 2 illustrates an example of the optical channel add/drop node 24. An optical signal A enters the node 24 and passes through the channel drop component 26 of the node 24. The channel drop component 26 includes at least one optical filter card 28 containing optical filters. Those wavelengths that are dropped exit the filter card 28 in the direction of arrow B, while the remaining wavelengths pass through the filter card 28 in the direction of arrow C, and enter the channel add component 30. Wavelengths to be added to the signal enter the channel add component 30 in the direction of arrow D, and combine at the optical multiplexor 32, to exit the channel add/drop node 24 in the direction of arrow E.

In typical optical networks, wavelengths are grouped in pairs. There is a primary wavelength $\lambda$, with a complementary wavelength $\lambda'$. If k is a working wavelength, $\lambda'$ is a protect wavelength. The protect wavelength is used when the working wavelength fails to properly transmit as a result of component failure or other complication. A working wavelength and its corresponding protect wavelength typically are dropped at the same nodes. Thus, it makes sense for the same filters to drop the two wavelengths together. In other words, if a particular filter drops $\lambda$, that filter should also drop $\lambda'$.

According to one embodiment, wavelengths $\lambda 1, \lambda 2, \lambda 3, \ldots \lambda 18$ are the eighteen droppable wavelengths from the even 20 C-band 14, whereas wavelengths $\lambda 1, \lambda 2, \lambda 3, \ldots \lambda 22$ are the 22 droppable wavelengths from the odd 22 C-band 20 (the same applies for the L band). A filter card (Fi) is defined as a set of four or six wavelengths (i.e., Fi={$\lambda i, \lambda j, \lambda k, \lambda l,$}, or Fi={$\lambda i, \lambda j, \lambda k, \lambda l, \lambda m, \lambda An$}). The wavelengths in the set are the wavelengths that the filter card 28 can add and drop. The parameter of either four or six wavelengths per filter card originates in that the present day filter cards are most typically offered with four or six wavelengths. One of ordinary skill in the art will understand that a filter card (Fi) can have a different number of wavelengths in accordance with the present invention, and thus the invention is not limited to four or six wavelengths per card. However, such filter card arrangements are not commonly available, and therefore the example embodiments are shown assuming filter cards having four or six wavelengths.

The set of filter cards S={Fi, Fj, Fk, Fl}. One of ordinary skill in the art recognizes that there can be more or less filter cards than four, however, four filter cards are utilized herein for illustrative purposes.

One objective of filter design is to specify how many filter cards are required for a particular network configuration, and which wavelengths are included in each filter card.

It should be noted that to attempt to optimize the filter design, an assumption must be made that the filter assignment algorithm can be solved optimally given a set of available filters. With this assumption, the filter sets can be designed without taking into account the peculiarities of the specific filter assignment algorithm that network planning might use at any one time.

Another assumption is that the filter assignment algorithm, as understood by one of ordinary skill in the art, is independent of a wavelength assignment and grooming algorithm. The filter assignment algorithm cannot influence how circuits are routed and bandwidth is assigned. The filter assignment algorithm only finds out the best combination of filters to be used for the wavelengths (decided by the wavelength assignment and grooming algorithms) that need to be dropped at a given optical add/drop node.

A third assumption is that the wavelength assignment and grooming algorithm, as understood by one of ordinary skill in the art, is optimal. This algorithm finds the best possible circuit assignments such that an optimal filter assignment algorithm can minimize the number of termination hardware components, such as wavelength interface cards, required. This assumption implies that the output of the wavelength assignment and grooming algorithm must depend on the set of filter cards available.

An interference function $F(\lambda)$ can be defined that returns a binary value for every wavelength processed. If wavelength $\lambda$ carries traffic across an optical add/drop node 24, and no traffic terminates at the optical add/drop node 24, then $F(\lambda)$="bad". If wavelength $\lambda$ carries traffic across an optical add/drop node 24, and traffic terminates at the optical add/drop node 24, $F(\lambda)$="good".

The network can drop a "good" wavelength without having to regenerate the signal because either the wavelength must be dropped for other reasons, or the wavelength does not carry any traffic. A "bad" wavelength carries traffic across the optical add/drop node 24. Dropping a "bad" wavelength requires the network to regenerate the wavelength using extra hardware, such as a wavelength interface card.

The goal of the filter assignment algorithm is therefore to drop one or more "good" wavelengths as decided by the wavelength assignment algorithm, while dropping the fewest number of "bad" wavelengths. A value of 1 is assigned to "bad" wavelengths, and a value of 0 to "good" wavelengths. Thus, the filter assignment algorithm must minimize $\Sigma F(\lambda)$ for all wavelengths X dropped at the optical add/drop node 24.

The wavelength assignment and grooming algorithm, as understood by one of ordinary skill in the art, decides whether a wavelength is "good" or "bad". Since the output of an optimal wavelength assignment and grooming algorithm depends on the circuit demand and the existing filter cards as previously mentioned, interference function $F(\lambda)$ is also a function of the traffic demand and existing filter cards. Assuming the wavelength assignment and grooming algorithm is deterministic, then interference function $F(\lambda)=F(\lambda, T, S)$, where T is a traffic demand and S is the set of available filter cards 28.

The traffic demand, T, can be a random variable with any probabilistic distribution, which makes the interference function, $F(\lambda, S)$, a random variable as well. The function $P(\lambda, S)$ is the probability that $F(\lambda, S)=1$. For a single wavelength, $\lambda d$, that the network needs to drop at a given optical add/drop node 24 as decided by the wavelength assignment and grooming algorithm, the filter assignment algorithm finds a filter card that drops $\lambda d$, while dropping the fewest "bad" wavelengths.

Filter card A and filter card B represent two filter cards that can drop the wavelength $\lambda d$. However, filter card A also has a filter for wavelength $\lambda 1$, and filter card B also has a filter for wavelength $\lambda 2$. The optimal solution is one in which the network utilizes the filter card that contains no "bad" wavelengths. Such a filter card is called a "good" filter. The probability of finding a "good" filter is $1-P(\lambda 1) P(\lambda 2)$ if interference functions $F(\lambda 1)$ and $F(\lambda 2)$ are not correlated. If interference functions $F(\lambda 1)$ and $F(\lambda 2)$ are fully correlated, the probability of finding a "good" filter is lower at $1-P(\lambda 1)$. Under a correlation rule, the probability functions indicate that the more correlation between wavelength $\lambda 1$ and $\lambda 2$, the lower the probability of a "good" filter.

The correlation rule applies to any number of filters. If there are N filters that drop wavelength $\lambda d$, then the probability that at least one of the N filters is "good" is maximized when the correlation between all other wavelengths $\lambda$ in the filters is minimized. The correlation rule guides the design of the optical filter cards 28. The network utilizes the optical filter cards 28 wherein for any given wavelength $\lambda d$, the correlation between all random variables $F(\lambda)$ for all wavelengths $\lambda$ that share a filter card 28 with the wavelength $\lambda d$, is minimized.

The source of correlation between wavelengths $\lambda$ is the set of filter cards 28. If two wavelengths $\lambda 1$ and $\lambda 2$ are present in the same filter card 28, then the interference functions $F(\lambda 1)$ and $F(\lambda 2)$ are positively correlated. This is because if $\lambda 1$ is a "good" wavelength and must be dropped, then it is more likely for the optimal wavelength assignment and grooming algorithm to assign circuits to the wavelength $\lambda 2$ that also must be dropped, so that $\lambda 2$ is a "good" wavelength as well. The fact that wavelength 11 and wavelength $\lambda 2$ share a common filter card 28 implies that the interference functions $F(\lambda 1)$ and $F(\lambda 2)$ are correlated.

If the wavelength $\lambda 2$ also shares another filter card 28 with anther wavelength $\lambda 3$, then transitively the interference functions $F(\lambda 1)$ and $F(\lambda 3)$ are also correlated, although it is a lesser correlation than that between interference functions $F(\lambda 1)$ and $F(\lambda 2)$. Therefore, linking wavelengths X with common filter cards 28 induces positive correlation between the interference functions of these wavelengths.

Thus, the term "correlation" as utilized herein refers to a range of the strength of the link between any two interference functions or wavelengths. The strength of the link can range from a strong link between two wavelengths on a same filter card, to a weaker link between two wavelengths on distal filter cards.

It is preferable for the two wavelengths $\lambda 1$ and $\lambda 2$ to not be linked together by a chain of filter cards 28. Alternatively, it is preferable for the length of a linked chain to be as long as possible to minimize the correlation between the interference functions of any two wavelengths $\lambda$. Each filter card contains at least one filter for a specific wavelength. If a first filter card has a filter for a common wavelength to a second filter card, that commonality forms one link of the chain of filter cards. If, in turn, the second filter card contains another filter for a wavelength common to a third filter card, then a second link is formed in a chain of three filter cards. The chains can proceed in this manner to link any number of filter cards together by common filters.

Figure 3:
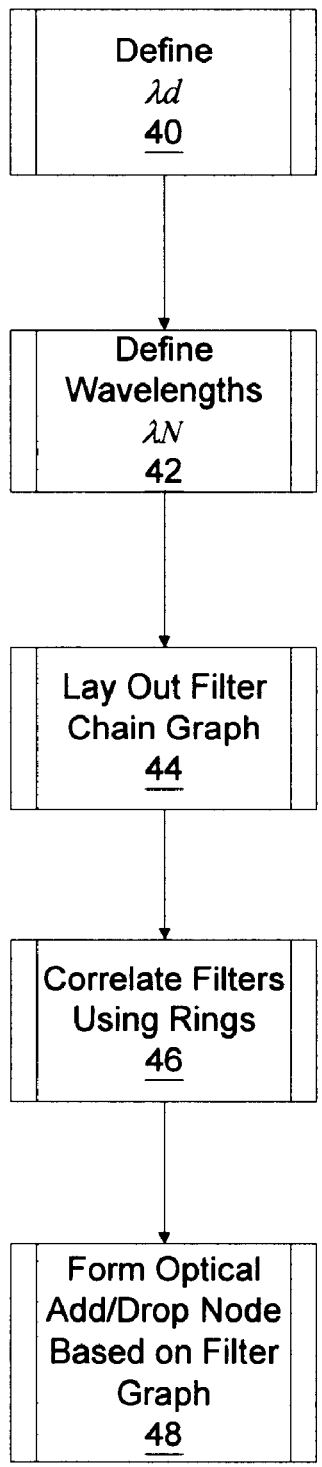
FIG. 3 is a flow chart illustrating steps performed to identify what filters should be on optical filter cards according to one embodiment of the present invention.

Based on the correlation and filter card chain observations, the optical filter card 28 can be designed utilizing the following method as illustrated in FIG. 3. Wavelength $\lambda d$ is defined as any wavelength in the system (step 40). Wavelengths $\lambda 1, \lambda 2, \lambda 3, \ldots \lambda N$ are defined as all of the wavelengths that share a common filter card 28 with the wavelength $\lambda d$ (step 42). The design of the optical filter card 28 attempts to maximize the distance separating each of the wavelengths $\lambda 1, \lambda 2, \lambda 3, \ldots \lambda N$ from each other.

Figure 4:
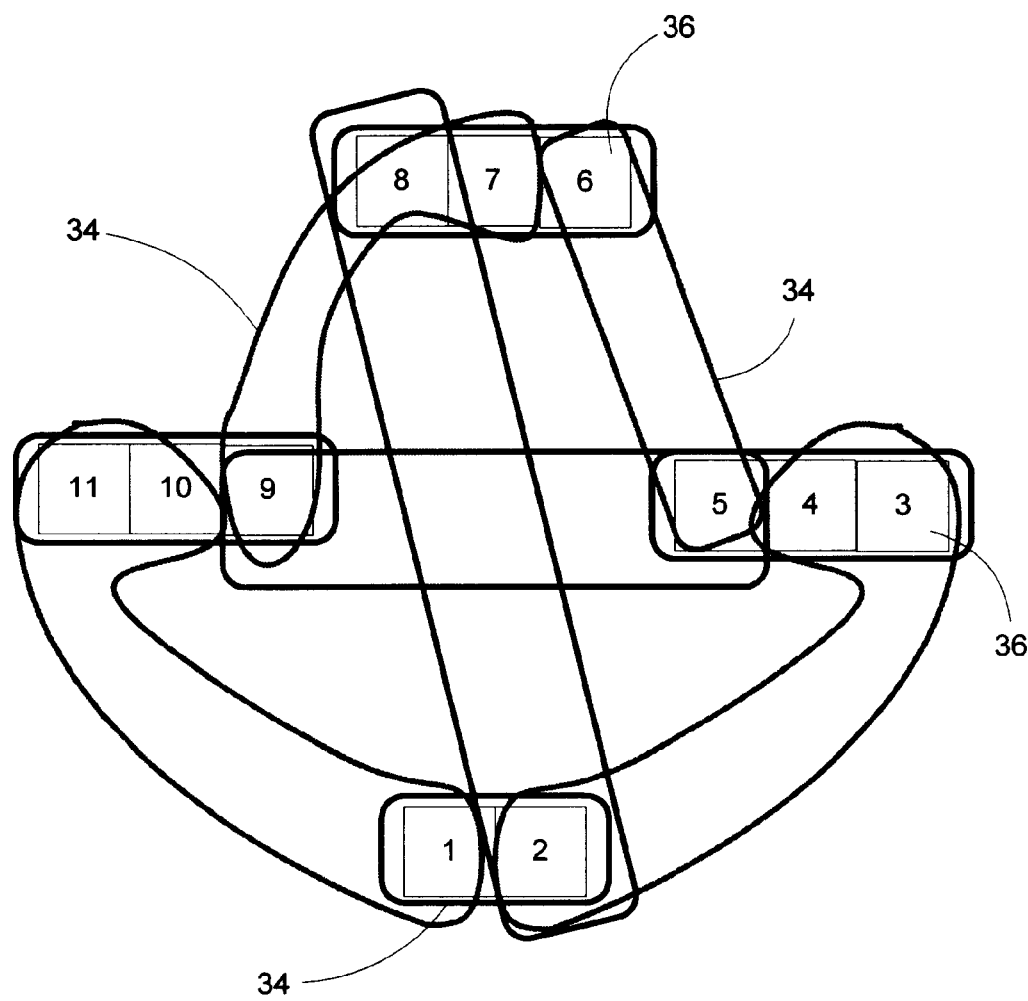
FIG. 4 is a graphical representation of a filter card assignment according to one embodiment of the present invention.

FIG. 4 illustrates one example implementation of the method of the present invention. The figure illustrates a filter card chain graph. The distance separating each of the wavelengths $\lambda 1, \lambda 2, \lambda 3, \ldots \lambda N$ on the filter card chain graph must be maximized to ensure that the correlation between the interference functions $F(\lambda N)$ of $\lambda 1, \lambda 2, \lambda 3, \ldots \lambda N$ is minimized.

The filter chain graph is laid out (step 44), grouping individual filters 36 in groups of two or three, because as previously mentioned, the filters 36 are most commonly manufactured in this arrangement. Groupings of two or three filters have also been empirically found to best maximize the number of possible configurations while minimizing the number of filter correlations required.

Any number of filters 36 can form each of the groups within the filter card. The total number of filters 36 in the odd band 22 of the C-band 14 is eleven because the C-band 14 has twenty-two wavelengths including the primary and the protect wavelengths, thus eleven filters 36 are required to filter all of the wavelengths. Every numbered square represents a pair of wavelengths $\lambda N$ and $\lambda N'$.

The objective in forming the rings 34 is to maximize the distance between any two wavelengths, while minimizing the total number of rings 34 and thus the total number of filter cards 28 and maintaining the ability to filter all of the wavelengths that require filtering, i.e., the "good" wavelengths. The number of cards determined to be necessary to maintain in inventory at the manufacturing stage defines the minimum number of cards. The more optical filter cards there are that have different filter combinations, the higher the inventory costs are, and thus the more costly it is to manufacture the add/drop node. Correspondingly, the fewer the number of optical filter cards required to be maintained in inventory, the lower the inventory costs, and thus the lower the overall manufacturing cost.

The minimum number of filter cards 28 is determined and defined as a predetermined number of optical filter cards 28 based at least partially on the desired inventory levels as described. This predetermined minimum number is then utilized to further determine the wavelength combinations for each of the filter cards 28.

The method proceeds with drawing the predetermined number of rings 34 (each ring creating an optical filter card 28) around different combinations of filters 36 (step 46) to indicate correlations between wavelengths. In the illustrative embodiment of FIG. 4, it was determined that ten filter cards 28, and thus ten rings 34, is the desired predetermined minimum number to be held in inventory for the particular add/drop node. Again, one of ordinary skill in the art will understand that there can be any number of optical filter cards having different combinations of wavelength filters combined and correlated on each card. However, the greater the number of optical filter cards, the more inventory is required during the manufacturing stage. Thus, the minimum number necessary is the preferable number of cards to use.

Every ring 34 represents a filter card 28 that contains a filter 36 for each of the wavelengths encircled by the ring 34. The objective in forming the rings 34 is to maximize the distance between any two wavelengths while maintaining the ability to filter all of the wavelengths that require filtering, i.e., the "good" wavelengths. The greater the number of optical filter cards 28, the greater the probability of finding a particular optical filter card having all "good" wavelength filters. However, the number of filter cards 28 has already been determined in this illustrative example. Thus, the greater the distance between any two wavelengths, the better coverage provided by the predetermined number of optical filter cards, and the better the add/drop node is able to handle the filtering demands without unnecessary regenerations required.

The distance between filters is indicated by the number of rings 34 required to pass through to go from any one wavelength to any other wavelength. This distance must be maximized, i.e. the number of filters in the chain between any two wavelengths must be maximized.

In graph of FIG. 4, for example, the distance between pair 9 and pair 6 is two rings 34, whereas the distance between pairs 9 and 5 is only one ring 34. In addition, each filter 36 "1" through "11" is grouped with at least two rings 34, and thus, two filter cards 28.

The resulting graph provides an indication of which filters 36 should be grouped together in filter cards 28 of the optical add/drop node 24, as indicated by each ring 34. The optical add/drop node 24 is then formed (step 48) in accordance with known procedures as understood by one of ordinary skill in the art, with the corresponding filters appropriately grouped in the filter cards 28.

The design method of the illustrative embodiment of the present invention maximizes the probability of finding a "good" filter for any wavelength $\lambda d$ that must be dropped by decreasing the correlation between associated wavelengths $\lambda 1, \lambda 2, \lambda 3, \ldots \lambda N$. The design method further maximizes the probability that no "bad" wavelength is dropped, or equivalently, that there is no requirement for unnecessary electronic regeneration using wavelength interface cards.

Figure 5:
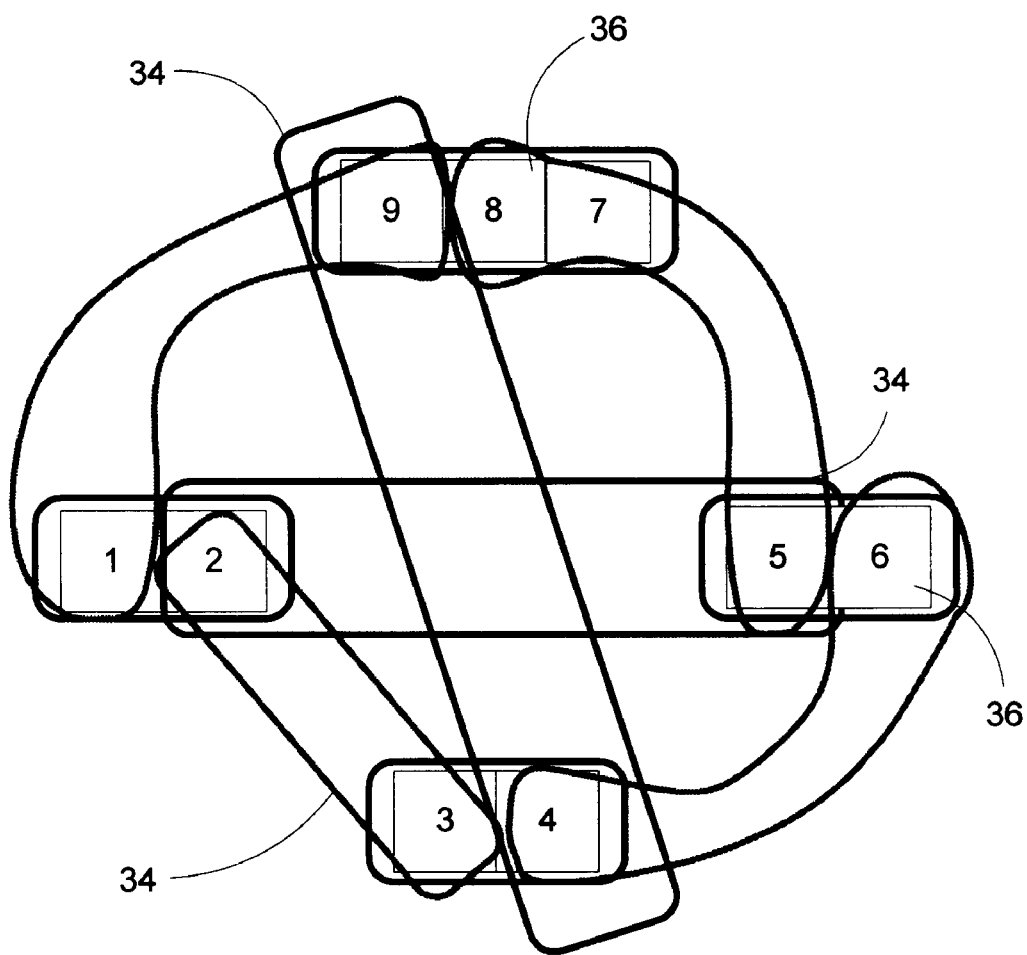
FIG. 5 is a graphical representation of another filter card assignment according to one embodiment of the present invention.

It should be noted that the graphs of FIG. 4 and FIG. 5 illustrate merely two possible example outcomes of the analysis and method of the present invention. One of ordinary skill in the art will appreciate that the outcome of the process can differ slightly, thus resulting in different arrangements of optical filters utilizing the present case. Applicants intend for the spirit and scope of the present invention to extend to all such different outcomes utilizing the method of the present invention.

FIG. 5 illustrates another example implementation of the method of the present invention with a filter card chain graph for the even band 20 of the C-band 14. Wavelength $\lambda d$ is again defined as any wavelength in the system (step 40). Wavelengths $\lambda 1, \lambda 2, \lambda 3, \ldots \lambda N$ are defined as all of the wavelengths that share a common filter card 28 with the wavelength $\lambda d$ (step 42). The filter chain graph is laid out (step 44), grouping individual filters 36 in groups of two or three. In this example implementation, the even band 20 contains eighteen wavelengths $\lambda$, thus there must be nine filters 36, "1" through "9", to provide the filtering capacity to accommodate both the primary and protect wavelengths.

The method proceeds with drawing rings 34 around different combinations of filters 36 (step 46). The resulting combination of filters 36 is then transformed into the final product optical filter cards (step 48) as understood by one of ordinary skill in the art.

The method of the present invention provides an approach to the design of optical add/drop nodes for an optical network. Taking into consideration several variables, such as number of wavelengths to be filtered or dropped, known filter assignment algorithms and their predicted outcomes, known wavelength assignment and grooming algorithms and their predicted outcomes, the use of an interference function to assign binary values relating to "good" and "bad" wavelengths, and the development and use of the correlation rule, the graph and ultimately the design of the filter and layout of the optical filter card for the optical add/drop node are constructed. The method results in an optical add/drop node having an optical filter card optimized to increase the probability that the requirement of unnecessary wavelength regeneration is minimized. With fewer wavelength regenerations, fewer WICs are required, and thus the overall costs associated with the optical add/drop node are reduced.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A method for designing optical filter cards to arrive at an optical filter card arrangement, comprising the steps of:
   providing a plurality of optical wavelength filters for filtering predetermined optical wavelengths disposed on a plurality of filter cards;
   determining which of said optical wavelengths are filtered by each of said optical wavelength filters;
   designating correlations between optical wavelengths filtered by each of said optical wavelength filters, wherein for a given wavelength, the correlation between all wavelengths that share an optical filter card with the given wavelength is minimized to arrive at said optical filter card arrangement.

2. The method of claim 1, wherein said providing step comprises determining a set of optical wavelengths requiring filtering.

3. The method of claim 1, wherein said determining step comprises identifying specific wavelength filters to correspondingly filter said optical wavelengths.

4. The method of claim 1, wherein said designating step comprises indicating a correlation between any wavelengths located on a same filter grouping.

5. The method of claim 1, wherein said designating step comprises indicating the placement of groupings of said wavelength filters together on said optical filter cards.

6. The method of claim 1, wherein said designating step comprises indicating a correlation between wavelengths of different filter groupings, such that distal wavelengths are grouped to form said correlation.

7. The method of claim 1, wherein said designating step comprises indicating a correlation between any wavelengths located on a same filter grouping and indicating a correlation between wavelengths of different filter groupings, such that distal wavelengths are grouped to form said correlation.

8. The method of claim 1, further comprising the step of manufacturing said optical filter cards having an arrangement of filters designed to minimize a need for regeneration of wavelengths unnecessarily dropped by said filter cards.

9. An optical filter node, comprising:
   a plurality of optical filters arranged into a plurality of filter cards, wherein each of said plurality of optical filter cards is optimized to contain predetermined groupings of optical filters, wherein the number of groupings is predetermined in a manner that a distance in a filter chain graph separating each of the optical filters from each other is minimized.

10. The optical filter node of claim 9, wherein said predetermined groupings of optical filters is such that each of said predetermined groupings of optical filters correlates proximal optical wavelengths with each other.

11. The optical filter node of claim 9, wherein said predetermined groupings of optical filters is such that each of said predetermined groupings of optical filters correlates distal optical wavelengths with each other.

12. The optical filter node of claim 9, wherein said predetermined groupings comprise one of groups of two and groups of three optical filters.

13. A method for designing optical filter cards, comprising the steps of:
   representing a plurality of wavelength filters in a filter chain graph;
   establishing correlations between proximal wavelengths by indicating such correlation on said filter chain graph; and
   adding additional correlations between distal wavelengths, wherein a distance in the filter chain graph separating each of the wavelength filters from each other is maximized to design the optical filter cards.

14. The method of claim 13, wherein said step of representing comprises listing each of said wavelength filters in said filter chain graph.

15. The method of claim 14, wherein said listing step comprises laying out each of said wavelength filters in a substantially circular arrangement to depict distance between wavelength filters.

16. The method of claim 14, wherein said step of listing comprises grouping proximal wavelengths in one of groups of two and groups of three.

17. The method of claim 13, wherein said step of establishing comprises linking said proximal wavelength filters together on said filter chain graph.

18. The method of claim 17, wherein said step of linking comprises linking said proximal wavelengths filters together in one of groups of two and three.

19. The method of claim 17, wherein said linking step represents placing said wavelength filters together on optical filter cards.

20. The method of claim 17, wherein said step of linking comprises depicting rings around said proximal wavelength filters.

21. A method for designing optical filter cards, comprising the steps of:
   representing a plurality of wavelength filters in a filter chain graph;
   establishing correlations between proximal wavelengths by indicating such correlation on said filter chain graph; and
   adding additional correlations between distal wavelengths, wherein a predetermined number of rings are drawn around different combinations of filters on said filter chain graph to indicate correlations between the wavelength filters and wherein each ring creates an optical filter card.

22. The method of claim 21, wherein the number of rings is predetermined in a manner that a distance in the filter chain graph separating each of the wavelength filters from each other is minimized.

23. The method of claim 22, wherein the distance between filters is indicated by the number of rings required to pass through to go from any one wavelength to any other wavelength.

* * * * *

UNITED STATES PATENT AND TRADEMARK OFFICE
CERTIFICATE OF CORRECTION

PATENT NO. : 6,549,312 B2  
DATED : April 15, 2003  
INVENTOR(S) : Narvaez et al.

It is certified that error appears in the above-identified patent and that said Letters Patent is hereby corrected as shown below:

Column 2,  
Line 50, replace "or a an optical" with -- of an optical --;

Column 5,  
Line 62, replace "with anther wavelength" with -- with another wavelength --;

Column 6,  
Line 7, replace "and λ2 to not" with -- and λ2 to not --; and

Column 7,  
Line 39, replace "In graph of FIG.4," with -- In the graph of FIG.4, --.

Signed and Sealed this

Third Day of February, 2004

JON W. DUDAS  
*Acting Director of the United States Patent and Trademark Office*